United States Patent Office 3,471,509
Patented Oct. 7, 1969

3,471,509
OXADIAZOLES
William J. McKillip, 5055 S. Bryant Ave.,
Minneapolis, Minn. 55419
No Drawing. Filed June 17, 1965, Ser. No. 464,841
Int. Cl. C07d 85/52; C08f 45/44; C08g 51/44
U.S. Cl. 260—307                          3 Claims

ABSTRACT OF THE DISCLOSURE

A class of substituted 1,2,4-oxadiazoles are disclosed; such oxadiazoles having utility as plasticizers and textile antistatic agents.

---

The present invention relates to novel oxadiazoles, to methods for their preparation and to their utility as plasticizers and antistatic agents.

Although many compounds are capable of plasticizing resins, they are not suitable for such purpose because of limited compatibility, exudation and solvent extractability. Thus compounds which plasticize a resin may be compatible with the resin but may also readily exude thereby adversely affecting impact strength, low temperature toughness, and related properties. Compounds which do not exude or are not readily extracted by solvents with which the resin comes in contact, on the other hand, may not be compatible. A particular need for plasticizers which meet the criterions set forth exists in vinyl polymers such as polyvinyl halides, polyvinyl ethers, polyvinylidene halides, polyvinyl esters and the like. In view of extensive commercial utility of polyvinyl chloride, the search for improved plasticizers for polyvinyl chloride is of particular importance.

It is an object of the present invention to provide a novel class of chemical compounds.

It is a further object of this invention to provide novel substituted 1,2,4-oxadiazoles.

It is another object of the present invention to provide plasticizers and antistatic agents for vinyl polymers.

It is still a further object to provide improved plasticized vinyl polymers containing the novel substituted 1,2,4-oxadiazoles.

It is still another object of the present invention to provide a process for the preparation of the novel substituted 1,2,4-oxadiazoles.

Other objects will become apparent from the following description and claims of the invention.

The novel, substituted oxadiazoles of the present invention have the general formulas:

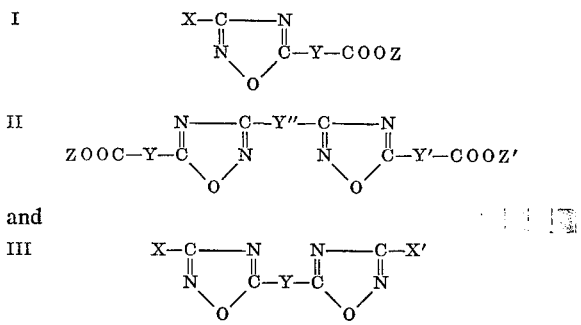

and wherein X and X' are hydrocarbyl radicals, or substituted hydrocarbyl radicals, Z and Z' are hydrocarbyl radicals, substituted hydrocarbyl radicals or hydrogen, and Y and Y' are divalent radicals bonded to the oxadiazole ring by a carbon atom which is free of ethylenic unsaturation and Y″ is a divalent radical bonded to the oxadiazole rings by carbon atoms which are not attached to the same aromatic double bond.

The term hydrocarbyl radical is intended to define any monovalent radical derived from a saturated or unsaturated molecule consisting of carbon and hydrogen. The term substituted hydrocarbyl radical or substituted divalent hydrocarbon radical is intended to define hydrocarbon radicals having one or more carbon atoms bonded to an oxygen, nitrogen, sulfur or phosphor atom.

The hydrocarbyl and substituted hydrocarbyl radicals bonded to the oxadiazole ring and to the acid group include such radicals as alkyl radicals, e.g., methyl, ethyl, butyl, octyl, tridecyl, pentadecyl, octadecyl, 2,4,6-trimethylhexyl, docosyl, hexacosyl and the like; cycloalkyl radicals, e.g., cyclohexyl, methylcyclohexyl and the like; aryl radicals such as phenyl, naphthyl and the like; alkenyl radicals, e.g., butenyl, docosenyl, octodecenyl, and the like; cycloalkenyl radicals, e.g., cyclohexenyl, bicyclo-(2,2,1)-hepten-2-yl and the like; alkaryl radicals, e.g., xylyl, tolyl, p-ethylphenyl and the like; aralkyl radicals, e.g., benzyl, 2-phenylethyl, p-methylbenzyl and the like; alkoxyalkyl radicals, e.g., 2-methoxyethyl, 2-ethoxyethyl, 2,4-diethoxyhexyl and the like; alkoxyaryl radicals, e.g., o-ethoxyphenyl, 2,4-methylethoxyphenyl and the like; mercaptoalkyl radicals, e.g., 2-ethylmercaptoethyl and the like; mercaptoaryl radicals such as o-ethylmercaptophenyl and the like; alkylaminoalkyl, e.g., 2-N,N-diethylaminoethyl and the like; haloalkyl radicals, e.g., 3,4-dichlorobutyl, 1-bromoethyl, 1,1,1-trifluoroethyl and the like; and haloaryl radicals, e.g., 2,3-dibromophenyl, 4-chlorophenyl and the like. Generally these radicals contain from 1 to 26 carbon atoms. Preferred, however, are the unsubstituted hydrocarbyl radicals of 3 to 15 carbon atoms.

The divalent radicals Y, Y', and Y″ which are bonded to the oxadiazole ring by carbon atoms free of the defined unsaturation include divalent hydrocarbon radicals such as alkylene, cycloalkylene, and arylene as well as substituted divalent hydrocarbon radicals such as alkoxyalkylene, dialkylaminoalkylene, halogen substituted alkylene and arylene, mercapto substituted alkylene and arylene radicals and the like. These radicals differ from the above-described hydrocarbyl radicals and substituted hydrocarbyl radicals in having an additional unsatisfied carbon valence. The divalent radical can also contain one or more hetero atoms such as oxygen, sulfur, nitrogen, phosphorus, and the like between the carbon atoms bonded to the oxadiazole ring. Examples of divalent radicals are dialkylene ether radicals and diarylene ether radicals having the generator formulas —R—O—R'— or —R—(O—R)$_n$—O—R— such as diethylene ether and polyethylene ether radicals; dialkylene- and diarylene sulfones having the general formula —R—SO$_2$—R'— such as dimethylene sulfone; dialkylene and diarylene sulfides having the general formula —R—S—R'— such as dipropylene sulfide; dialkylene ester radicals, diarylene ester radicals and alkylene- arylene ester radicals having the general formula —R—CO$_2$—R'—CO$_2$—R— or —R—(CO$_2$—R')$_n$—CO$_2$R— such as diethylene adipate and diethylene poly(ethylene terephthalate), dialkylene and diarylene phosphones having the general formula —R—PO—R'— such as diphenylene phosphone; dialkylene and diarylene amides having the general formulas

—R—CO$_2$—NH—R'—NH—CO$_2$—R— and

—R-(CO$_2$—NH—R'—NHCO$_2$R')$_n$CO$_2$NHR— such as diethylene adipamide and diethylene poly(hexamethylene adipamide) and the like. The letters R and R' are intended to indicate a divalent hydrocarbon radical and the letter $n$ is intended to indicate the degree of polymerization which is generally in the range of 2 to 10. As a result of abnormal behavior of a few starting materials, certain oxadiazoles containing a double bond at the carbon atom attached to the oxadiazole ring cannot be formed and these are excluded by the foregoing definition of the novel oxadiazoles. The preferred divalent radicals are alkylene radicals of 2 to 8 carbon toms and divalent aryl radicals of 6 to 10 carbon atoms.

The novel oxadiazoles of the present invention are prepared by reactions illustrated in the following equations in which R and R″ are monovalent radicals while R′ is a divalent radical:

(A) 1. $RCN + H_3NOH \cdot HCl + NaOH \xrightarrow{+H_2O}$

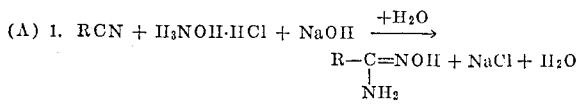

2. 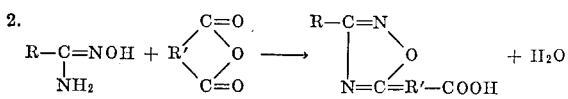

3. 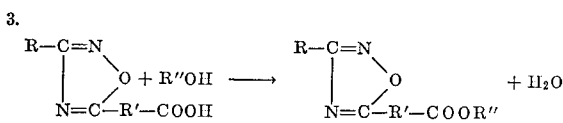

(B) 1. $NC-R'-CN + H_2NOH \cdot HCl \longrightarrow HON=C-R'-C=NOH$
with $NH_2$ $NH_2$ below 2. 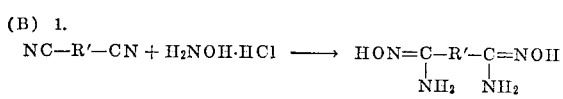

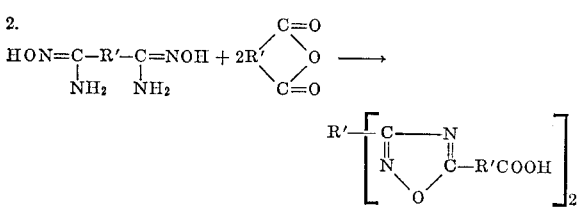

3. 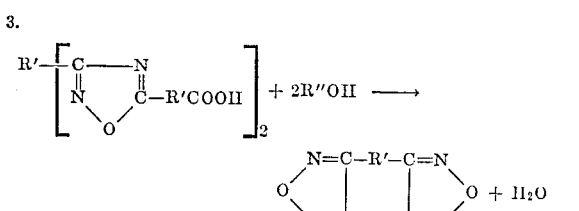

(C) 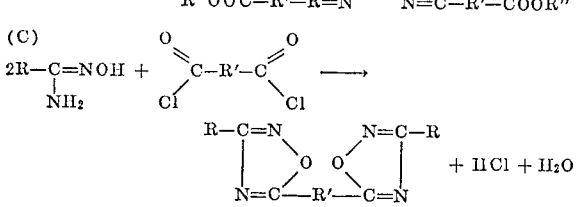

The reaction of the nitrile or dinitrile with the hydroxylamine hydrochloride (Reaction A-1, B-1) results in the formation of the amidoxime and is carried out by adding to the nitrile an aqueous or alcoholic solution of the hydroxylamine hydrochloride and a base such as an alkali metal ion containing aqueous or alcoholic solution. Any hydroxylamine acid salt can be used as a source of hydroxylamine, such as hydroxylamine hydrochloride, hydroxylamine sulfate, hydroxylamine acetate, hydroxylamine nitrate, hydroxylamine chlorate, hydroxylamine perchlorate, and the like. Any proton acceptor which is stronger than the hydroxylamine can be used as a base such as sodium hydroxide, potassium hydroxide, triethylamine, sodium carbonate, pyridine and the like. An excess of base is generally employed. The specific order of addition of the reagents, however, can be altered without affecting the ability of the reaction to proceed. The resulting mixture is agitated at a temperature of 50° to 100° C. in a reaction vessel equipped with a reflux condenser. The amidoxime is isolated from the reaction mixture by filtration and evaporation of the solvent and purified by recrystallization. The alkali metal ion, which is preferably sodium, is generally supplied to the reaction in the form of aqueous sodium hydroxide or an alcoholic solution of a sodium alkoxide.

The amidoxime is then reacted with the anhydride of a dibasic acid to form the oxadiazole ring (Reaction A-2). The reaction takes place at elevated temperatures at which water is volatilized from the reaction mixture. Suitable reaction temperatures range from 100° to 200° C. Preferably the reaction is carried out in an inert solvent which allows the azeotropic removal of water. Suitable solvents are aromatic hydrocarbons such as benzene, toluene, and xylene, or halogenated hydrocarbons such as trichloroethylene, bromobenzene and the like. The oxadiazole acid can be isolated by precipitation and filtration or directly reacted with a suitable alcohol to result in the desired oxadiazole ester (Reaction B-2). The esterification which is generally carried out at elevated temperatures between 100° to 200° C. is accelerated by the addition of an acid catalyst such as sulfuric acid, methane sulfonic acid, benzene sulfonic acid, toluene sulfonic acid or acidic ion exchange resins.

In the formation of the bis-oxadiazole of Reaction C a dibasic acid dichloride is employed to permit formation of the oxadiazole ring at both acid groups on reaction with the amidoxime. The reaction of the amidoxime with the dibasic acid dichloride results in the formation of the diamine hydrochloride addition product which is then neutralized with a base such as sodium hydroxide. Ring closure is achieved by heating the neutralized product to temperatures of 100° to 200° C.

Any mononitrile or dinitrile in which the nitrile groups are not interconnected by an aromatic double bond can be employed to form the oxadiazoles of the present invention. The preferred nitriles are the aliphatic mononitriles such as nitriles derived from fatty acids, i.e., acids having from 12 to 26 carbon atoms, such as dodecylnitrile, tridecyl nitrile, hexadecyl nitrile, stearyl nitrile, oleyl nitrile, behenyl nitrile, and the like; aliphatic dinitriles such as adipyl dinitrile, sebacyl dinitrile, azelayl dinitrile, tetrahydrophthalyl dinitrile, dihydrophthalyl dinitrile and the like; aryl nitriles such as benzonitrile; aralkyl nitriles such as benzylnitrile; alkaryl nitriles such as para- and metatolylnitrile, aromatic dinitriles such as isophthalyl dinitrile, terephthalyl dinitrile and the like.

The dibasic acid anhydrides and dibasic acid dichlorides employed in the process of forming the oxidiazoles of the present invention are aliphatic and aromatic dibasic acid anhydrides which do not contain an ethylenic double bond between carbon atoms attached to the acid groups. Examples of such acid compounds are succinic anhydride, glutaric anhydride, phthalic anhydride, dihydrophthalic anhydride, tetrahydrophthalic anhydride, nadic anhydride and the like. The diacid dichlorides suitable in the formation of the novel oxadiazoles include adipyl dichloride, sebacyl dichloride, azelayl dichloride, terephthalyl dichloride, tetrahydrophthalyl dichloride and the like.

The alcohols employed to esterify the oxadiazole acid can differ significantly in structure from each other without affecting the esterification. Suitable alcohols include alkanols such as methanol, ethanol, butanol, hexanol, octanol, tridecanol, octadecanol, and the like; diols such as ethylene glycol, diethylene glycols, 1,4-butanediol, 1,6-hexanediol, 2-ethyl-1,6-hexanediol and the like; polyesters having terminal hydroxyl groups obtained by the condensation of dibasic acids or acid anhydrides with excess diols; and alcohols which contain ether oxygens, keto oxygens, sulfur atoms and similar hetero atoms.

Specific examples of the novel oxadiazoles of the present invention are:

butyl 4-(3-phenyl-1,2,4-oxadiazolyl)butyrate,
2-ethylhexyl 4-(3-phenyl-1,2,4-oxadiazolyl)butyrate,
tridecyl 4-(3-cyclohexyl-1,2,4-oxadiazolyl)butyrate, butyl 3-(3-tridecyl-1,2,4-oxadiazolyl)propionate,
butyl 8-(3-phenyl-1,2,4-oxadiazolyl)octanoate,
phenyl 4-(3-phenyl-1,2,4-oxadiazolyl)butyrate,
butyl 2-(3-phenyl-1,2,4-oxadiazolyl)cyclohexen(4)oate,
tridecyl 2-(3-phenyl-1,2,4-oxadiazolyl)cyclohexen(4)oate,
2-ethylhexyl 2-(3-undecyl-1,2,4-oxadiazolyl)cyclohexen(4)oate,
butyl 2-(3-phenyl-1,2,4-oxadiazolyl)benzoate,
tridecyl 2-(3-octyl-1,2,4-oxadiazolyl)benzoate,
octadecyl 4-(3-phenyl-1,2,4-oxadiazolyl)butyrate,
methyl 4-(3-octadecyl-1,2,4-oxadiazolyl)butyrate,
1,3-di(5-(2-ethylhexyl 4-butyrato)-1,2,4-oxadiazolyl)benzene,
1,4-di(5-(butyl 3-propionato)-1,2,4-oxadiazolyl)benzene,
1,6-di(5-(butyl 4-butyrato)-1,2,4-oxadiazolyl)hexane,
1,8-di(5-(2-ethylhexyl 3-propionato)-1,2,4-oxadiazolyl)octane,
1,2-di(5-(2-ethylhexyl 3-propionato)-1,2,4-oxadiazolyl)cyclobutane,
1,2-di(5-(phenyl 3-propionato)-1,2,4-oxadiazolyl)cyclobutane,
1,2-di(5-(butyl 2-benzoato)-1,2,4-oxadiazolyl)cyclobutane,
1,2-di(5-(tridecyl 3-propionato)-1,2,4-oxadiazolyl)benzene,
1,3-butylene di-3-(3-phenyl-1,2,4-oxadiazolyl)propionate,
1,4-di(3-phenyl-1,2,4-oxadiazolyl)butane,
1,4-di(3-octyl-1,2,4-oxadiazolyl)butane,
1,7-di(3-phenyl-1,2,4-oxadiazolyl)heptane,
1,1′-di(3-phenyl-1,2,4-oxadiazolyl)dimethyl sulfone and
1,2-di(3-octadecyl-1,2,4-oxadiazolyl)cyclobutane.

The preferred oxadiazoles of the present invention are alkyl 4-(3-aryl-1,2,4-oxadiazolyl)butyrates, alkyl 3-(3-aryl-1,2,4 - oxadiazolyl)propionates, 1,3-di(5-(alkyl 4-butyrato)-1,2,4-oxadiazolyl)benzenes 1,3-di(5-(alkyl 3-propionato)-1,2,4 - oxadiazolyl)benzenes and alpha-omega-di(3-aryl-1,2,4-oxadiazolyl)alkanes in which the aryl group is a single ring aryl group and preferably a phenyl group, the alkyl group contains from 1 to 13 carbon atoms and the alkane contains from 2 to 8 carbon atoms.

The novel oxadiazoles of the present invention and particularly the oxadiazole ester derivatives of the present invention are employed as palsticizers in vinyl polymers in concentrations normally employed for the plasticization of such resins. Polymers of vinyl monomers which are suitably plasticized include polymers of vinyl halides, polyvinylidene halides, vinyl ethers, vinyl esters, and acrylic monomers, e.g., esters of acrylic and methacrylic acid and acrylonitrile. In general plasticizer concentrations will vary from 5 to 100 percent and preferably 35 to 60 percent by weight of the resin. The compounding of the resin and the plasticizer is carried out in accordance with procedures known in the art using equipment such as rubber mills or Banbury mixers.

The preparation of the oxadiazoles of the present invention is further illustrated by the following examples. Unless otherwise indicated, all units of quantities are by weight.

EXAMPLE I

Into a reaction flask were charged a cold solution of 414 g. of hydroxylamine hydrochloride in 1500 ml. of methanol and 240 g. of sodium hydroxide dissolved in 2000 ml. of methanol. The resulting sodium chloride precipitate was filtered off and the filtrate was placed in a five-liter flask equipped with a reflux condenser and a water trap. To the filtrate was added 412 g. of benzonitrile and the reaction mixture was refluxed for 7.5 hours. Volatiles were then removed on the flash evaporator. The product was taken up in ether and the resulting mixture filtered. The ether was evaporated, and 471 g. of the amidoxime was obtained.

To a two-liter flask equipped with reflux condenser and water trap were charged 600 ml. of toluene, 210.8 g. of the amidoxime and 176.7 g. of glutaric anhydride under nitrogen. The reaction mixture was refluxed for 25 hours at which time no further water was distilled over.

To this reaction mixture was then added 221 g. of 2-ethylhexanol and 0.75 g. of p-toluene sulfonic acid. The reaction mixture was refluxed at 130° to 170° C. for 34 hours. The solvent was then stripped under vacuum and 530 g. of the crude 2-ethylhexyl 4-(3-phenyl-1,2,4-oxadiazolyl)butyrate was obtained. The oxadiazole ester was purified by distillation at a temperature of 186° to 196° C. at a pressure of 0.15 to 0.18 mm. mercury.

EXAMPLE II

Into a three-neck reaction flask equipped with stirrer, reflux condenser with water trap, and thermometer were charged 200 ml. of toluene, 83.2 g. of glutaric anhydride and 100 g. of benzamidoxime. The reaction mixture was refluxed for 1.5 hours and then filtered. On extraction with boiling water the oxadiazole acid was recrystallized from acetonitrile. The oxadiazole acid had a melting point of 100° to 101° C.

To a three-neck flask equipped with stirrer, reflux condenser with water trap and thermometer were charged 60 g. of the oxadiazole acid, 22.2 g. of butanol, 175 ml. of toluene and 0.2 g. of p-toluene sulfonic acid. The reaction mixture was refluxed for 5 hours in which time 4 ml. of water was distilled out. The solvent was stripped and the residue distilled at 0.2 mm. mercury pressure. The n-butyl 4-(3-phenyl-1,2,4-oxadiazolyl)butyrate distilled over at a temperature of 147° to 151° C. to give a 55 g. yield. The redistilled product has a boiling point at 159.5° C. at 0.07 mm. mercury.

*Analysis.*—Calcd.: C, 66.67; H, 6.94; N. 9.72; O, 16.67. Found: C, 66.86; H, 7.12; N, 9.56; O, 16.46.

EXAMPLE III

Into a reaction flask equipped with stirrer, thermometer and reflux condenser with water trap were charged 100 ml. of xylene, 27.2 g. of benzamidoxime and 29.6 of of phthalic anhydride. The reaction mixture was heated to reflux and the reflux continued until 3.5 ml. of water had been distilled out. On addition of butanol in slight excess over the stoichiometric quantity required and additional refluxing, the reaction mixture was flash evaporated and the resulting product taken up in ether. On evaporation of the ether butyl 2-(3-phenyl-1,2,4-oxadiazolyl)benzoate was obtained.

EXAMPLE IV

To a three-neck, 500 ml. flash equipped with thermometer, stirrer and reflux condenser with water trap were charged about 200 ml. of toluene, 28.5 g. of glutaric anhydride and 34.0 g. of undecylamidoxime obtained from the reaction of undecylnitrile with hydroxylamine hydrochloride substantially as described in Example I. The reaction mixture was heated to reflux and reflux continued until 6 ml. of water had distilled out. The reaction mixture was flash evaporated and the remaining product taken up in ether. The ether solution was dried, filtered and evaporated to give an oil comprising the oxadiazole acid.

To a three-neck flask equipped with stirrer, thermometer and reflux condenser with water trap were charged about 100 ml. of toluene, 40 g. of the oxadiazole acid, 12 g. of butanol and about 0.1 g. of sulfuric acid. The reaction mixture was heated to reflux and reflux continued for a period of 4 hours at which point an additional 10 g. of butanol was added. Reflux was continued until a total of 2.4 ml. of water had been distilled out of the reaction mixture. The solvent and excess alcohol were removed by flash evaporation leaving 42 g. of butyl 4-(3-undeycl-1,2,4-oxadiazolyl)butyrate which could be directly employed as plasticizer without any further purification.

EXAMPLE V

To the described reaction flask were charged about 100 ml. of toluene, 27.2 g. of benzamidoxime, 33.2 g. of 3,6-methylene-4-cyclohexene-1,2-dicarboxylic anhydride. The reaction mixture was refluxed for 7 hours at 120° C. and 3 ml. of water was taken off. The reaction mixture was allowed to stand for about 12 hours at room temperature. A precipitate formed and was filtered off, rinsed with benzene, dissolved in ethanol and reprecipitated with water. There was obtained 23 g. of the oxadiazole acid having a melting point at 175° to 176° C.

To a reaction flask equipped as above described was charged about 100 ml. of toluene, 20 g. of the oxadiazole acid 7.4 g. of butyl alcohol and about 0.1 g. of sulfuric acid. The reaction mixture was refluxed for a period of 5 hours. The solvent was stripped on the flash evaporator. The resulting oily liquid was distilled at 183° to 190° C. at a pressure of 0.25 to 0.75 mm. mercury and butyl 2-(3-phenyl-1,2,4-oxadiazolyl)-3,6-methylene - 4 - cyclohexene carboxylate was obtained.

EXAMPLE VI

To a reaction flask equipped as described above were charged about 100 ml. of toluene, 27.2 g. of benzamidoxime and 44.8 g. of tetrapropenyl succinic anhydride. The reaction mixture was refluxed at 120° C. for a period of 7 hours in which time 3 ml. of water was distilled off. The solvent was removed by flash evaporation and the product was refluxed in toluene with 35 g. of butanol and methane sulfonic acid as the catalyst. Solvent and excess butanol were stripped off after 30 hours of refluxing. The reaction mixture was washed with 5% sodium bicarbonate solution until neutral and separated. The remaining water was stripped off on a flash evaporator and butyl 3(3-phenyl-1,2,4-oxadiazolyl)-1,1,2,2 - tetra(1 - propenyl)propionate was obtained.

EXAMPLE VII

Into a three-neck flask equipped with a condenser, stirrer and dropping funnel were charged 40.8 g. of benzamidoxime dissolved in 100 ml. of dioxane and 51 g. of triethylamine. To the mixture was then slowly added 27.5 g. of adipyl dichloride dissolved in 100 ml. of dioxane during which time the reaction mixture was kept below 15° C. by placing the flask in an ice bath. The resulting product precipitated and was filtered and washed with dioxane. The product was then refluxed in excess toluene and filtered. The product was 1,4-di(3-phenyl-1,2,4-oxadiazolyl)butane.

EXAMPLE VIII

To a three-neck flask equipped with a stirrer, reflux condenser with water trap and dropping funnel was charged 304 g. of tetrahydrophthalic anhydride dissolved in 450 ml. of toluene. To this solution was slowly added 272 g. of benzamidoxime while the solution was heated. The reaction mixture was then refluxed at 115° C. for a period of 5.5 hours and allowed to stand for a period of 12 hours at room temperature. The resulting precipitate was filtered. The precipitate was taken up in benzene and n-hexane was added until the volume of hexane equalled that of benzene. The mixture was cooled on an ice bath and 301 g. of the oxadiazole acid precipitated out and was filtered and dried.

To a three-neck flask equipped with a stirrer, thermometer and reflux condenser with water trap were charge 81 g. of the oxadiazole acid dissolved in 150 ml. of benzene, 48 g. of butanol and 0.1 g. of p-toluene sulfuonic acid. The reaction mixture was refluxed for 2 hours at 82° C. and seven drops of sulfuric acid were added. The benzene was then replaced by toluene and the reaction mixture was refluxed at 110° to 120° C. for 8 hours in which time 5.5 ml. of water was removed. The resulting solution was shaken with dilute sodium bicarbonate to remove the acid and separated. The toluene solution was dried over sodium sulfate and flash evaporated. A yield of 64 g. of butyl 2-(3-phenyl-1,2,4-oxadiazolyl)-4-cyclohexene carboxylate was obtained.

EXAMPLE IX

Employing the procedure of Example VIII with 68 g. of the oxadiazole acid of Example VIII, 72 g. of 2-ethylhexanol and 0.1 g. of p-toluene sulfonic acid a yield of 74 g. of 2-ethylhexyl 2-(3-phenyl-1,2,4-oxadiazolyl)-4-cyclohexene carboxylate was obtained.

EXAMPLE X

To a three-neck flask equipped with stirrer, dropping funnel and reflux condenser with water trap were charged under nitrogen 210.8 g. of benzamidoxime, 176.7 g. of glutaric anhydride and about 600 ml. of toluene. The reaction mixture was refluxed for about 2.5 hours until no further water distilled over. To the reaction mixture was then added 340 g. of tridecyl alcohol and 0.75 of sulfuric acid. The reaction mixture was refluxed at 130° to 170° C. for 34 hours. On stripping of the solvent, 665 g. of product was obtained which was distilled at 230° C. at a pressure of 0.25 mm. mercury to result in 474 g. of tridecyl 4-(3-phenyl-1,2,4-oxadiazolyl)butyrate.

EXAMPLE XI

To a solution of 56 g. of bis-diacetyl sulfone dichloride in 150 ml. of benzene was added 82 g. of benzamidoxime dissolved in about 200 ml. of benzene. The reaction mixture was gently heated and filtered while hot. The solution was cooled by addition of benzene. The resulting precipitate was isolated and treated with dilute aqueous sodium hydroxide until slightly basic. On filtration and drying, the product, 70 g., was heated in a flask until no further water evolved, cooled and dissolved in dimethyl formamide. On purification with activated charcoal, water was added and the product was allowed to precipitate over a 12 hour period. On filtration and washing with ethanol 12 g. of bis-(3-phenyl-1,2,4-oxadiazolyl)dimethylsulfone was obtained.

EXAMPLE XII

To a solution of 136 g. of benzamidoxime in benzene was added 113 g. of azelayl dichloride dissolved in benzene with constant stirring. The resulting precipitate was filtered and dried. The hydrochloride addition product, 236 g., was dissolved in water and neutralized with sodium hydroxide. The resulting precipitate was filtered, washed and dried. A part of the precipitate, 88 g., was refluxed in xylene for a period of about 2 hours and on flash evaporation of the xylene recrystallized from ethanol to result in 30 g. of 1,7-(3-phenyl-1,2,4-oxadiazolyl)heptane.

EXAMPLE XIII

Employing substantially the procedure of Example V butyl 3-(3-phenyl-1,2,4-oxadiazolyl)-3-dodecen(11)ylpropionate is prepared from benzamidoxime and the dodecenyl succinic anhydride.

EXAMPLE XIV

To a solution of 128 g. of benzamidoxime in benzene was added 96 g. of terephthalyl dichloride. The mixture was heated on a steam bath and filtered. The precipitate was dissolved in water and neutralized with sodium hydroxide until a pH of 8 was obtained. The resulting precipitate was washed with water twice and dried to give 165 g. of the addition product. The addition product was placed in a three-neck flask equipped with thermometer, reflux condenser and stirrer and about 300 ml. of acetic anhydride was added. The mixture was refluxed at 140° C. for 20 hours. The solution was cooled and filtered and recrystallized from acetic anhydride. A yield of 103 g. of 1,4-di(3-phenyl-1,2,4-oxadiazolyl)benzene was obtained.

EXAMPLE XV

To a three-neck flask equipped with reflux condenser, thermometer and stirrer were charged 33 g. of isophthalyl diamidoxime in 150 ml. of toluene and 39 g. of glutaric anhydride. The reaction mixture was refluxed at 115° C. for 4 hours until no further water was distilled over. The resulting mixture was treated with dilute sodium bicarbonate and was separated. The sodium bicarbonate solution was filtered and the oxadiazole acid was precipitated out. On washing and drying 42 g. of the oxadiazole acid was obtained.

To a three-neck flask equipped with stirrer, thermometer and reflux condenser with water trap were then charged the oxadiazole acid, 100 ml. of toluene, 43 g. of 2-ethylhexanol and 5 drops of methane sulfonic acid. The mixture was refluxed at 115° C. for 1.5 hours and 3.5 ml. of water was distilled off. The insoluble reaction product was dissolved in ether, shaken with dilute sodium bicarbonate, separated and stripped. The resulting product was dissolved in ethanol, treated with activated carbon, filtered, and the ethanol was stripped. A yield of 48 g. of 1,3 - di(5-(2-ethylhexyl butyrato)-1,2,4-oxadiazolyl)benzene was obtained.

EXAMPLE XVI

Into a three-neck reaction flask equipped as described were charged 200 ml. of toluene, 28 g. of 1,3-butylene glycol and 10 g. of 4-(3-phenyl-1,2,4-oxadiazolyl)butyric acid. The reagents were mixed and 10 drops of methane sulfonic acid and 0.12 g. of triphenyl phosphite added. The reaction mixture was refluxed at 115° C. for 2 hours. Excess toluene was drained and the reaction mixture was refluxed for an additional 5.5 hours at 120° C. at the end of which the reaction mixture had an acid value of 18. The reaction mixture was taken up in ether, shaken with dilute sodium bicarbonate and washed with water. The ether layer was dried, filtered and treated with activated carbon in benzene. The resulting solution was filtered and stripped. A yield of 93 g. of 1,3-butylene-di(3-(3-phenyl-1,2,4-oxadiazolyl)propionate) was obtained.

EXAMPLE XVII

To a three-neck flask equipped with stirrer, thermometer and reflux condenser with water trap were charged 59.4 g. of adipic acid, 41.7 g. of 1,3-butylene glycol and 100 ml. of toluene. On mixing, 0.12 g. of triphenyl phosphite and 0.12 g. of dibutyl tin oxide were added as esterification catalysts. The mixture was refluxed at 115° C. for 2.5 hours giving off 13 ml. of water. To the reaction mixture was then added 14.8 g. of 4-(3-phenyl-1,2,4-oxadiazolyl)butyric acid and the reaction mixture was refluxed for an additional 12 hours at 115° C. The reaction mixture was flash evaporated, the remaining product taken up in ether, filtered and shaken with dilute sodium bicarbonate. The water layer was drawn off and the ether layer dried over sodium sulfate. The ether layer was then stripped and 89 g. of the 3-(3-phenyl-1,2,4-oxadiazolyl)propionate ester of poly(1,3-butylene adipate) was obtained.

EXAMPLE XVIII

To a three-neck reaction flask equipped with a stirrer, thermometer and reflux condenser with water trap were charged 60 g. of succinic anhydride, about 150 ml. of toluene and 51.6 g. of 1,2-diamidoxime cyclobutane obtained by the reaction of the 1,2-dinitrile of cyclobutane and hydroxylamine hydrochloride. The reaction mixture was refluxed at about 115° C. until 10.8 ml. of water had been distilled out of the mixture. The solution was stripped and the residue taken up in water to which dilute sodium hydroxide was added. On acidification with hydrogen chloride an oil separated from the aqueous solution. The mixture was stripped, taken up in ethanol to which ethyl acetate was added to precipitate out the last traces of NaCl. This mixture was filtered and stripped to result in the oxadiazole acid.

The oxadiazole acid was charged to a three-neck flask equipped with stirrer, thermometer and reflux condenser with water trap together with about 200 ml. of toluene, 15 g. of 2-ethylhexanol and 10 drops of methane sulfonic acid. The reaction mixture was refluxed for a period of 3.5 hours at a temperature of 115° to 142° C. The product was worked-up substantially as described in Example XV and 51 g. of 1,2-di(5-(2-ethylhexyl 3-propionato)-1,2,4-oxadiazolyl)cyclobutane was obtained.

EXAMPLE XIX

To a three-neck reaction flask equipped with stirrer, thermometer and reflux condenser with water trap were charged about 50 ml. of toluene, 10 g. of sebacyl diamidoxime and 8.7 g. of succinic anhydride. The reaction mixture was refluxed until 1.5 ml. of water had distilled over. The toluene was stirpped and the residue taken up in dilute sodium hydroxide. The solution was acidified with dilute HCl to a pH of 3. The oxadiazole acid precipitated out and was filtered and dried. A yield of 13 g. was obtained.

To a three-neck reaction flask equipped with stirrer, thermometer, and reflux condenser with water trap were charged 13 g. of the oxadiazole acid, 10 g. of 2-ethylhexanol, about 50 ml. of toluene and 10 drops of methane sulfonic acid. The resulting mixture was refluxed until 1.9 ml. of water had distilled over. The solution was then stripped and the residue taken up in ether, treated with aqueous sodium bicarbonate to remove acid. The other layer on separation was dried and flash evaporated to result in 7 g. of product comprising 1,8-di(5-(2-ethylhexyl-3-propionato)-1,2,4-oxadiazolyl)octane.

EXAMPLE XX

To a three-neck reaction flask equipped as described were charged 294 g. of 3,3'-(tetramethylenedioxy)dipropionitrile, 228 g. of hydroxylamine hydrochloride in 300 ml. of water, 132 g. of sodium hydroxide in 150 ml. of water and 500 ml. of ethanol. The structure was heated to 85° C. for 12 hours. On stripping the solvents and water, rewashing and drying 294 g. of 3,3'-(tetramethylenedioxy)-dipropio amidoxime was obtained.

To a three-neck reaction flask equipped as described, were charged 52.4 g. of the diamidoxime, 48 g. of succinic anhydride and about 100 ml. of xylene. The reaction mixture was refluxed for a period of 3.5 hours in which time 14.5 ml. of water was distilled out. The reaction mixture was then flash evaporated. To the resulting solid in the flash evaporator was then added 65 g. of 2-ethylhexanol, about 150 ml. of toluene and 10 drops of sulfuric acid. The reaction mixture was refluxed for 2 hours in which time 9 ml. of water were distilled out. The reaction mixture was then flash evaporated and the residue treated with 10% aqueous sodium hydroxide. The water layer was separated and remaining water stripped off the liquid product which was then filtered. Excess 2-ethylhexanol was stripped on an oil bath and the product treated with activated carbon and filtered. A yield of 51 g. of 2,2'-di(3-(2-ethylhexyl 3-propionato) - 1,2,4-oxadiazolyl)tetramethylenedioxydiethane having the formula:

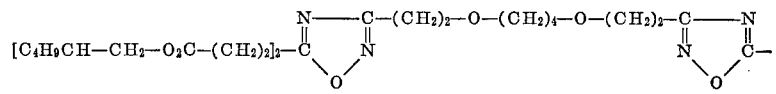

was obtained.

A number of plasticized polyvinyl chloride resins were prepared using 50 parts by weight of the plasticizers shown in Table I with 100 parts by weight of polyvinyl chloride, commercially available as Geon 101, by first hand mixing the plasticizer and the resin and thereafter rubber milling the mixture at 320° F. until a homogeneous composition was obtained. The tensile strength, 100% modulus, and elongation were measured employing ASTM methods developed for plastics on a Scott L-6 tensile tester. The Durometer hardness was measured on the A-2 scale with a 10 second delayed reading. The Clash and Berg torsion test was carried out in accordance with ASTM methods and measures the temperature at which a sample has a rigidity of 135,000 p.s.i. The hexane extractability was measured by submerging a 1″ x 3″ x 20 mil sample of the plasticized polyvinyl chloride in hexane at room temperature for 1 hour, heating the exposed sample at 225° F. for 1 hour and thereafter determining the weight loss. The soap solution extractability was determined by employing a 1% "Ivory" soap solution and submerging a 1″ x 3″ x 20 mil. sample in the solution for a period of 24 hours at 208° F. The sample was then heated at 225° F. for a period of 1 hour and the weight loss measured. Mineral oil extractability was determined by submerging a sample of the plasticized resin No. 1 in mineral oil for 24 hours at a temperature of 120° F., rinsing the sample with toluene and mineral spirit and measuring the weight loss.

and particularly in those which contain some polar groups. The oxadiazole structure of the novel compounds of the present invention also makes them useful in photographic compositions as color couplers and sensitizers.

What is claimed is:

1. A substituted 1,2,4-oxadiazole having the formula:

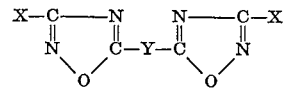

wherein X is phenyl and Y is a divalent radical selected from the group consisting of p-phenylene and the group having the formula:

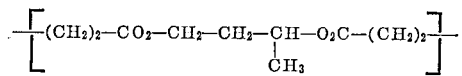

2. A substituted 1,2,4-oxadiazole in accordance with claim 1 wherein Y is p-phenylene.

3. A substituted 1,2,4-oxadiazole in accordance with claim 1 wherein Y is a divalent radical having the formula:

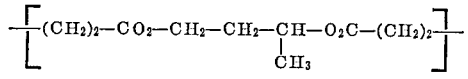

TABLE I

| Oxadiazole plasticizer of— | Tensile strength in p.s.i. | 100% modulus in p.s.i. | Percent elongation | Durometer hardness | Clash and Berg torsion test in ° C. | Hexane extractability in percent | Soap solution extractability in percent | Mineral oil extractability in percent |
|---|---|---|---|---|---|---|---|---|
| Example II | 2,954 | 1,022 | 364 | 82 | −27.0 | 2.42 | 24.74 | 7.50 |
| Example I | 3,116 | 1,346 | 374 | 81 | | 2.41 | 18.23 | 3.32 |
| Example X | 2,837 | 1,520 | 366 | 86 | −16.5 | 15.29 | 6.46 | 3.16 |
| Example VIII | 3,022 | 2,060 | 308 | 89 | +2.8 | 1.08 | 16.05 | 0.58 |
| Example IX | 2,961 | 2,250 | 334 | 91 | +0.3 | 0.85 | 10.18 | 0.29 |
| Example XV | 3,134 | 2,480 | 248 | 96 | +1.4 | 0.79 | 2.07 | 0.08 |
| Example IV | 2,322 | 1,364 | 298 | 84 | −44.4 | 13.28 | 20.54 | 20.93 |
| Example XVI | 3,516 | 3,022 | 256 | 97 | +9.3 | 0.38 | 14.60 | 0.60 |
| Example XVII | 3,029 | 2,634 | 232 | 97 | −1.5 | 0.25 | 15.35 | 0.38 |

The foregoing examples and data have illustrated the preparation of the novel substituted 1,2,4-oxadiazoles of the present invention. It will be apparent that the preparative methods described are equally applicable to other amidoximes falling within the scope of the general formulas described. In view of the nature of the reaction involved, it will be further apparent that a wide variety of substituents on the amidoxime and on the anhydride or diacid dichloride do not interfere in the formation of the oxadiazoles. In addition to the illustrated utility as plasticizers, the oxadiazoles of the present invention furthermore have utility aside from plasticizers. Thus, the oxadiazoles which contain two acid groups are suitable monomers in condensation reactions with diols and triols. The oxadiazoles of the present invention are furthermore useful as antistatic agents in a wide variety of resins,

References Cited

Eloy et al., C. A. 59; 3912a, Abstract of Bull. Soc. Chim. Belges, 72, 91–6 (1963).

Critchley et al., C. A. 61; 3097e, Abstract of Chem. Ind. (London) 1964 (19), 806-7.

Behr in Heterocyclic Compound—Five and Six-Membered Compounds with Nitrogen and Oxygen; 1962 Interscience Publishers, pp. 245, 248, 252.

ALEX MAZEL, Primary Examiner

R. V. RUSH, Assistant Examiner

U.S. Cl. X.R.

96—100, 106; 260—30.4